United States Patent
Lee (10) Patent No.: US 9,839,321 B2
(45) Date of Patent: Dec. 12, 2017

(54) GRILL CAGE

(76) Inventor: Ju Ho Lee, Seoul (KR)

(*) Notice: Subject to any disclaimer, the term of this patent is extended or adjusted under 35 U.S.C. 154(b) by 1389 days.

(21) Appl. No.: 12/095,291

(22) PCT Filed: Dec. 7, 2005

(86) PCT No.: PCT/KR2005/004172
§ 371 (c)(1),
(2), (4) Date: May 28, 2008

(87) PCT Pub. No.: WO2007/066838
PCT Pub. Date: Jun. 14, 2007

(65) Prior Publication Data
US 2010/0154773 A1     Jun. 24, 2010

(51) Int. Cl.
| A47J 37/04 | (2006.01) |
| A47J 37/00 | (2006.01) |
| F24C 3/00  | (2006.01) |
| A47J 37/06 | (2006.01) |
| F24B 3/00  | (2006.01) |
| A47J 31/16 | (2006.01) |

(52) U.S. Cl.
CPC ..................................... A47J 37/06 (2013.01)

(58) Field of Classification Search
CPC ....................................................... A47J 37/06
USPC ...... 126/19 R, 23, 25 R, 36, 37 B, 38, 39 C, 126/39 H–39 L, 41 B, 41 E, 41 R, 273; 99/396, 397, 450; 219/385–535
See application file for complete search history.

(56) References Cited

U.S. PATENT DOCUMENTS

| 1,956,387 | A | * | 4/1934  | Hartman  | 99/446 |
| 2,102,097 | A | * | 12/1937 | Sherman  | A47J 37/0688 99/340 |
| 2,297,825 | A | * | 10/1942 | Bobo     | A47J 37/041 126/41 B |
| 2,575,082 | A | * | 11/1951 | Wolff    | A47J 37/0704 126/154 |
| 2,619,951 | A | * | 12/1952 | Kahn     | A47J 37/0731 126/25 A |
| 2,709,996 | A | * | 6/1955  | Tescula  | A47J 37/0731 126/25 R |
| 3,091,170 | A | * | 5/1963  | Wilson   | A47J 37/0718 126/25 A |

(Continued)

FOREIGN PATENT DOCUMENTS

| JP | 50118164 U | * | 9/1975 | ............. A47J 37/06 |
| JP | 10248722 A1 |   | 9/1998 |  |
| KR | 201999002196 U |   | 1/1999 |  |

Primary Examiner — Steven B McAllister
Assistant Examiner — Desmond C Peyton
(74) Attorney, Agent, or Firm — STIP Law Group, LLC (57) ABSTRACT

A grill cage includes a body having four sides and a bottom provided with a plurality of through-holes formed on a surface of the bottom and a plurality of discharge holes framed in one or both edges of the bottom; a cover hingedly engaged to the body, and having four sides corresponding to the four sides of the body, and a bottom provided with a plurality of through-holes formed on a surface of the bottom of the cover, and a plurality of discharge holes formed in one or both edge parts of the bottom surface of the cover; and inner plates each of which is mounted on the body and the cover, and has four sides having a height lower than the sides of the body and the cover, and a plurality of through-holes formed on a bottom surface of the plate.

4 Claims, 7 Drawing Sheets

(56) References Cited

U.S. PATENT DOCUMENTS

| | | | | |
|---|---|---|---|---|
| 3,188,939 A * | 6/1965 | Smith | A47J 37/041 | |
| | | | 220/491 | |
| 3,237,621 A * | 3/1966 | Staley | A47J 37/0731 | |
| | | | 126/25 R | |
| 3,389,651 A * | 6/1968 | Schultz | A47J 37/0718 | |
| | | | 126/25 A | |
| 3,684,087 A * | 8/1972 | Anderson | A47J 37/0768 | |
| | | | 126/25 R | |
| 3,742,838 A * | 7/1973 | Luschen | A47J 37/0718 | |
| | | | 126/25 R | |
| 3,783,855 A * | 1/1974 | Newinger | A47J 37/0731 | |
| | | | 126/25 R | |
| 3,989,909 A * | 11/1976 | Hodsdon et al. | 381/391 | |
| 4,442,762 A * | 4/1984 | Beller | 99/427 | |
| 4,679,543 A * | 7/1987 | Waltman | A47J 37/06 | |
| | | | 126/25 R | |
| 4,784,109 A * | 11/1988 | Korpan | 126/25 R | |
| 5,211,105 A * | 5/1993 | Liu | A47J 37/067 | |
| | | | 126/348 | |
| 5,237,914 A * | 8/1993 | Carstensen | A47J 37/0786 | |
| | | | 99/400 | |
| 5,347,978 A * | 9/1994 | Zuran | 126/41 R | |
| 5,400,703 A * | 3/1995 | Ashcom | A47J 37/00 | |
| | | | 99/400 | |
| 5,590,584 A * | 1/1997 | Ahn | 99/327 | |
| 5,605,142 A * | 2/1997 | Parker | 126/9 B | |
| 5,848,567 A * | 12/1998 | Chiang | 99/375 | |
| 5,887,513 A * | 3/1999 | Fielding et al. | 99/421 A | |
| 5,911,812 A * | 6/1999 | Stanek | A47J 37/067 | |
| | | | 126/25 R | |
| 5,913,966 A | 6/1999 | Amone | | |
| 6,158,330 A * | 12/2000 | Andress | 99/445 | |
| 6,520,174 B1 * | 2/2003 | Scigliuolo | A47J 37/0786 | |
| | | | 126/25 R | |
| 6,622,616 B1 | 9/2003 | Measom | | |
| 6,644,298 B2 * | 11/2003 | Hermansen et al. | 126/25 R | |
| 7,305,982 B2 * | 12/2007 | Gross | A47J 37/079 | |
| | | | 126/25 B | |
| 2004/0020373 A1 * | 2/2004 | Chen | 99/349 | |
| 2005/0039612 A1 * | 2/2005 | Denny | 99/450 | |
| 2006/0180138 A1 * | 8/2006 | Lin | A47J 37/0611 | |
| | | | 126/25 R | |
| 2007/0163568 A1 * | 7/2007 | Murray | A47J 37/0713 | |
| | | | 126/50 | |
| 2007/0240698 A1 * | 10/2007 | Holbrook | A47J 37/0786 | |
| | | | 126/25 R | |
| 2008/0066734 A1 * | 3/2008 | Bright | A47J 37/067 | |
| | | | 126/25 R | |

\* cited by examiner

GRILL CAGE

TECHNICAL FIELD

The present invention relates to a grill which can prevent food to be roasted, such as meat or fish, from being scorched or sticking to grids and also prevent the quality and taste of the food from being deteriorated so as to roast the food in an optimum state.

BACKGROUND ART

In general, when food to be roasted (hereinafter referred to as "roast food") is roasted, the food is artificially turned on a grill or roasting fan. In this case, the roast food is partially scorched or sticks to grids by flames, before the whole roast food is evenly well cooked. Further, moisture or grease is excessively discharged from the roast food, so that the roast food is hardened or its inherent taste is deteriorated. Hence, it is difficult to properly roast the food in an optimum state.

On broiling the roast food, the moisture or grease discharged from the roast food drops on the burning charcoal disposed under the grill, which gives off smoke and makes soot. The smoke and soot are harmful to health or pollute circumferences. Also, when the grease is burnt by the burning charcoal, a bad odor is seriously produced, and simultaneously the burning charcoal sputters by the dropped moisture or grease, so that a user gets burned.

In particular, the above drawbacks become more serious in food services, such as in a barbecue store, where food is roasted according to a customer's order.

DISCLOSURE OF INVENTION

Technical Problem

Therefore, an object of the present invention is to solve the problems involved in the prior art, and to provide a grill which can prevent food to be roasted, such as meat or fish, from being scorched or sticking to grids and also prevent the quality and taste of the food from being deteriorated so as to roast the food in an optimum state.

Another object of the present invention is to provide a grill which can prevent a user from being harmful to health and prevent the circumference from being polluted.

Still another object of the present invention is to provide a grill which can be effectively used in food services such as a barbecue store.

Technical Solution

In order to achieve the above objects, there is provided a grill including a body having four sides and a bottom provided with a plurality of through-holes formed on a surface of the bottom and a plurality of discharge holes formed in one or both edges of the bottom; a cover hingedly engaged to the body, and having four sides corresponding to the four sides of the body, and a bottom provided with a plurality of through-holes formed on a surface of the bottom of the cover, and a plurality of discharge holes formed in one or both edge parts of the bottom surface of the cover; and inner plates each of which is mounted on the body and the cover, and has four sides having a height lower than the sides of the body and the cover, and a plurality of through-holes formed on a bottom surface of the plate.

Advantageous Effects

With the above-described construction of the grill, roast food does not directly contact flames so as to prevent moisture or grease from being dropped on burning charcoals and thus prevent the burning charcoal from sputtering.

The grill according to the present invention can solve the problems in that the roast food is partially scorched or overdone, by flames of the burning charcoal before the whole roast food is evenly well cooked, so that the quality and taste of the food is deteriorated.

Further, the grill according to the present invention does not give off smoke or soot by preventing grease from being dropped in an oven when the roast food is roasted, so that it is useful in food services, such as a barbecue store in which the food is roasted. Also, since the grill includes detachable body and cover, it is convenient to maintain the grill.

When the grill is rotated, with the roast food having a width smaller than a width of the grill being accommodated in the grill, a partition is interposed between the inner plates, so as to prevent the roast from leaning to one side. Also, in the case where the through-holes are formed in a rectangular shape, an inflow amount of the heat is remarkably increased, and a thermal efficiency is also significantly increased, thereby quickly roasting the roast food.

BRIEF DESCRIPTION OF THE DRAWINGS

The above objects, other features and advantages of the present invention will become more apparent by describing the preferred embodiment thereof with reference to the accompanying drawings, in which.

BEST MODE FOR CARRYING OUT THE INVENTION

Reference will now be made in detail to preferred embodiments of the present invention, examples of which are illustrated in the accompanying drawings.

Figure 1:
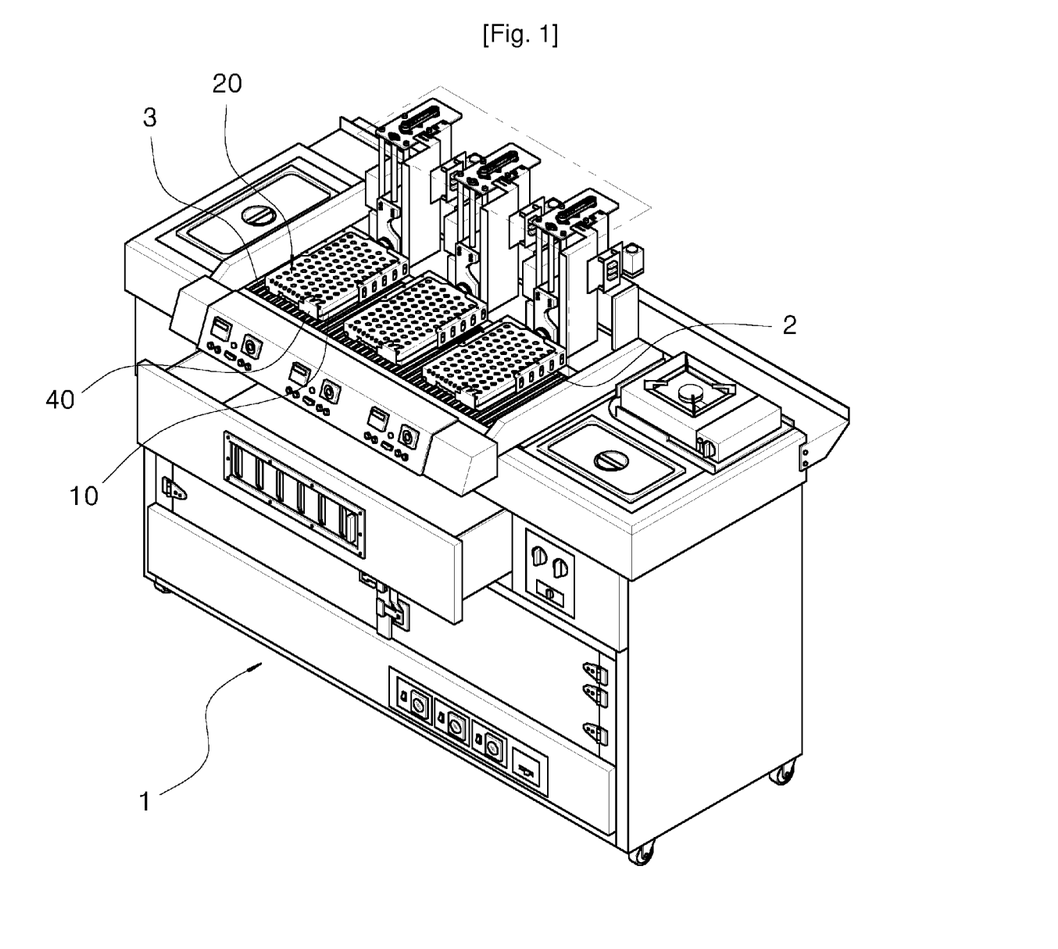
FIG. 1 is a perspective view illustrating a use example of a grill according to the first embodiment of the present invention.
Figure 2:
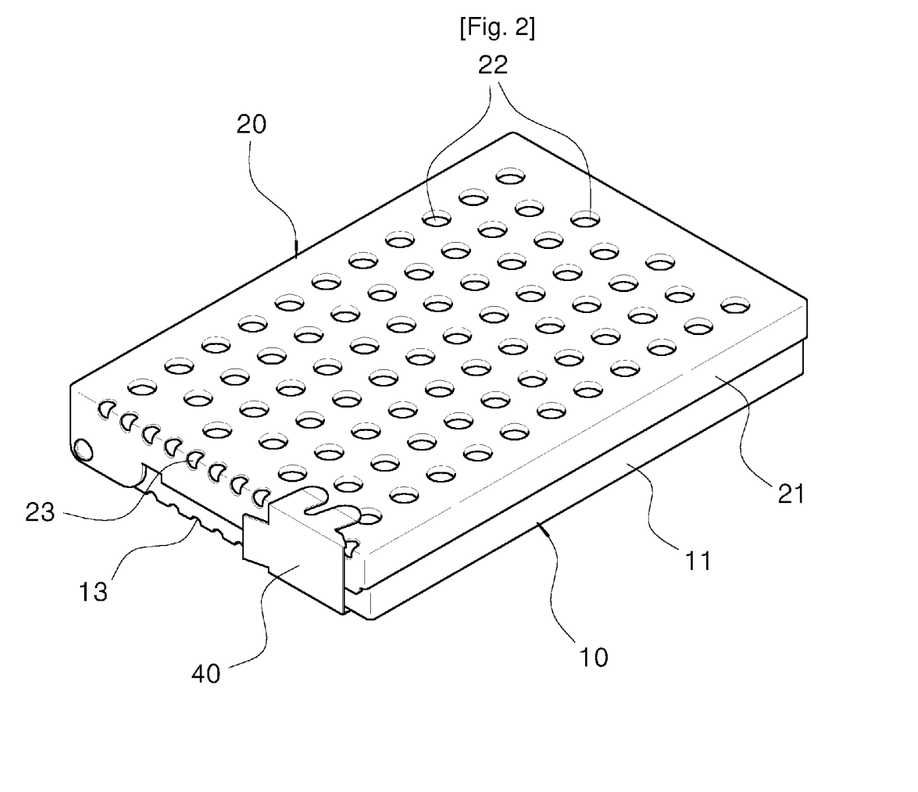
FIG. 2 is a perspective view illustrating a grill according to the first embodiment of the present invention.
Figure 3:
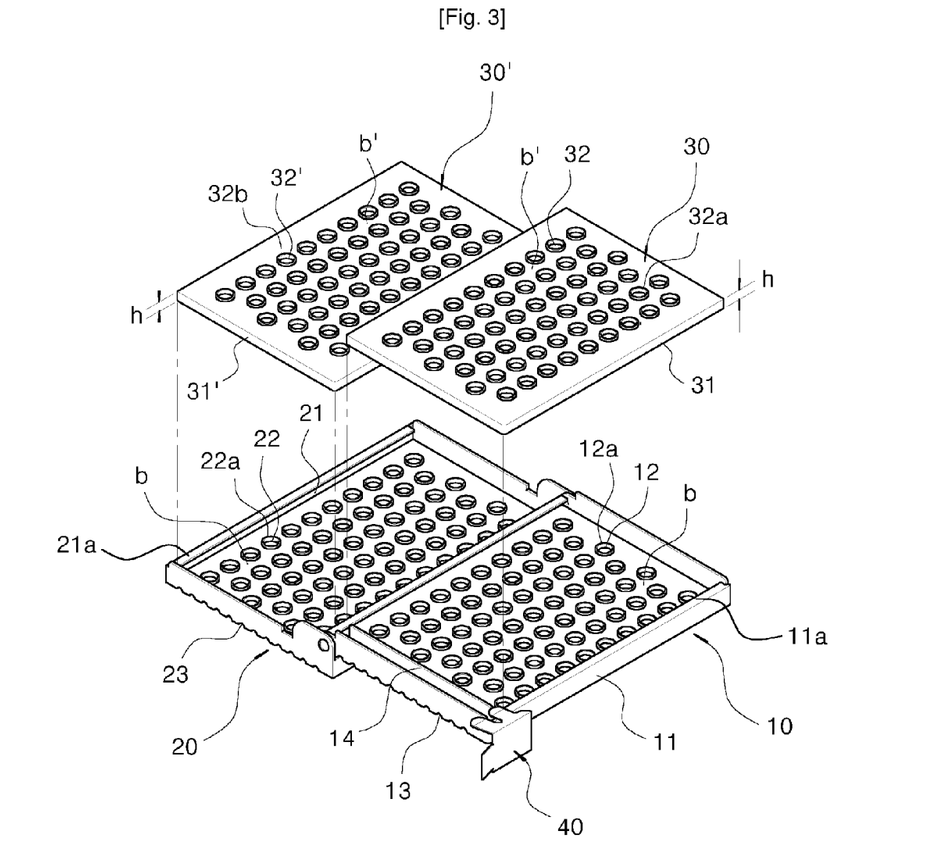
FIG. 3 is an exploded perspective view illustrating the grill according to the first embodiment of the present invention in FIG. 1.
Figure 4:
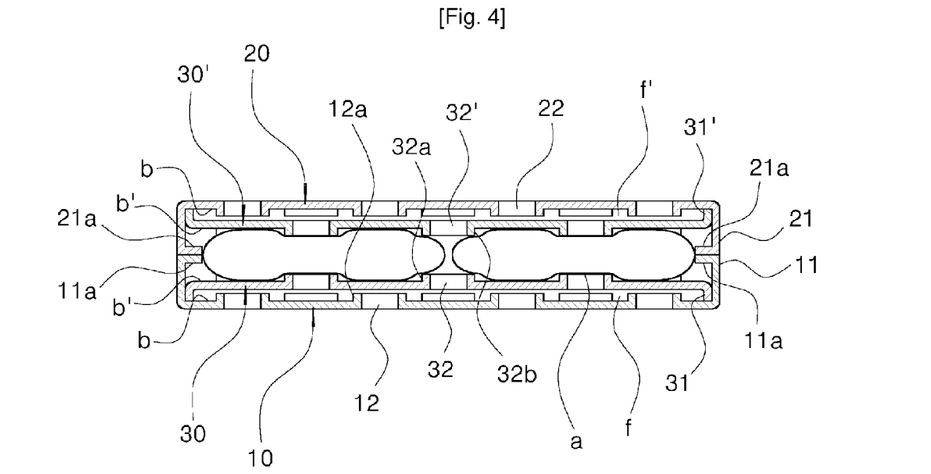
FIG. 4 is an enlarged cross-sectional view illustrating a grill according to the first embodiment of the present invention.
Figure 5:
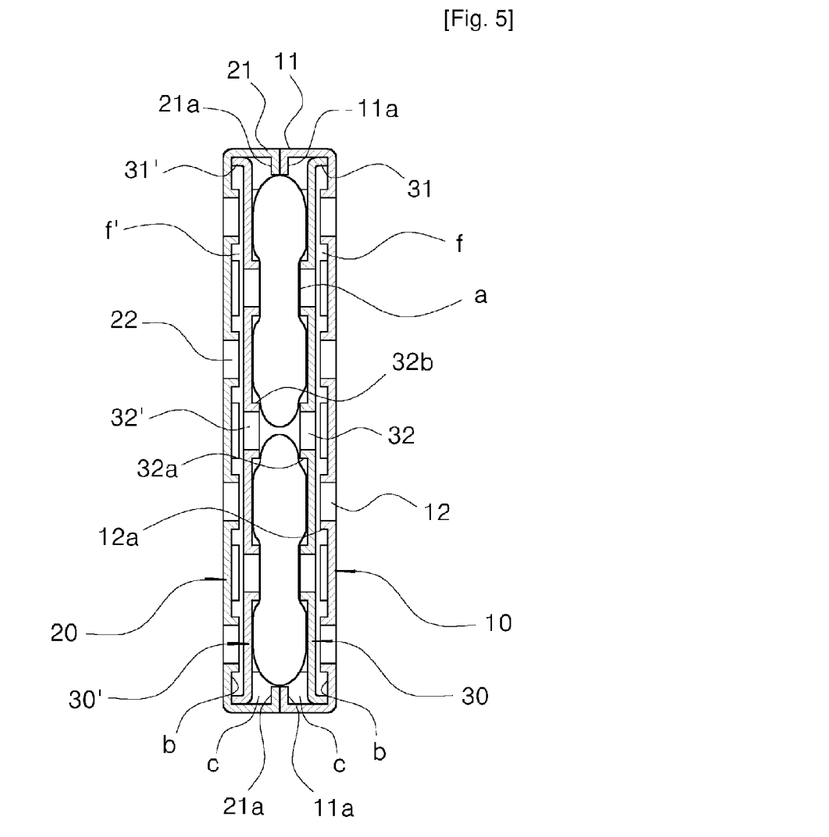
FIG. 5 is an enlarged cross-sectional view illustrating a grill according to the first embodiment of the present invention, in a state that the grill shown in FIG. 4 is rotated by an angle of 90 degrees.
Figure 6:
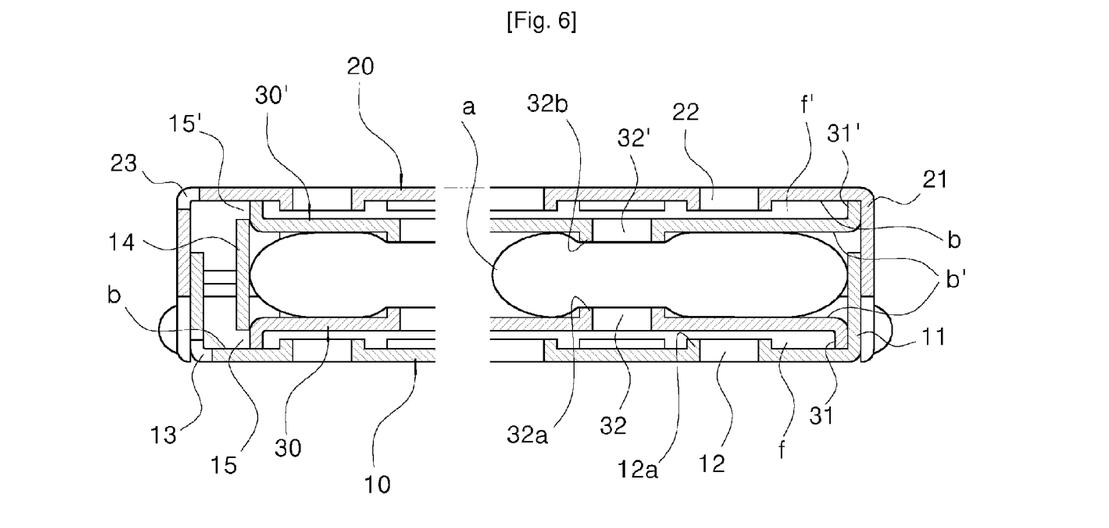
FIG. 6 is an enlarged longitudinal cross-sectional view illustrating a grill according to the first embodiment of the present invention, in which a portion of the grill shown in FIG. 4 is omitted.

FIG. 1 is a perspective view illustrating a use example of a grill according to the first embodiment of the present invention. FIG. 2 is a perspective view illustrating the grill according to the first embodiment of the present invention. FIG. 3 is an exploded perspective view illustrating the grill according to the first embodiment of the present invention in FIG. 2. FIG. 4 is an enlarged cross-sectional view illustrating the grill according to the first embodiment of the present invention. FIG. 5 is an enlarged cross-sectional view illustrating a grill according to the first embodiment of the present invention, in the state in which the grill shown in FIG. 4 is rotated by an angle of 90 degrees. FIG. 6 is an enlarged longitudinal cross-sectional view illustrating the grill according to the first embodiment of the present invention, in which a portion of the grill shown in FIG. 4 is omitted.

The roast according to the present invention comprises a body 10 having our sides 11, and a bottom provided with a plurality of through-holes 12 formed on a surface of the bottom and a plurality of discharge holes formed in one or both edges of the bottom; a cover 20 hingedly engaged to the body, and having four sides corresponding to the four sides of the body 10, and a bottom provided with a plurality of through-holes 22 formed on a surface of the bottom of the cover, and a plurality of discharge holes 23 formed in one or both edge parts of the bottom surface of the cover; inner plates 30 and 30' each of which is mounted on the body and the cover, and has four sides 31 and 31' having a height lower than the sides of the body and the cover, and a plurality of through-holes 32 and 32' formed on a bottom surface of the plate; and a locking member 40 for locking the cover covering the body.

The body 10 and the cover 20 are formed in a rectangular shape. When the cover is closed, ends of both short sides 21 of the cover enclose ends of both short sides 11 of the body. Shield pieces 11a and 21a having a desired length are inwardly extended from each edge of front and rear sides 21 and 11 which abut against each other.

Inner bosses 12a and 22a of the through-holes 12 and 22 which protrude inwardly from the bottom surfaces have a height lower than that the height h of the four sides 31 and 31' of each inner plate 30 and 30'. As the inner bosses protrude inwardly from the bottom surfaces, valleys b are formed between the inner bosses, when any one of the body 10 and the cover 20 is disposed at the lower position, the grease flowing out from the roast food a is not discharged through the through-holes 12 or the through-holes 22 outwardly, but is discharged through the discharge holes 13 or the discharge holes 23 outwardly.

The edge of the body 10, in which the discharge holes 13 are formed, is provided with a partition 14 in parallel with the edge at a desired interval. The lower end of the partition is spaced apart from the bottom surface of the body to form a passage 15 between the partition and the bottom surface, so that the grease flowing out from the roast food a flows outwardly through the partition and the discharge holes.

When the cover 20 is closed, the upper end of the partition 14 is spaced apart from the bottom surface of the cover at a desired interval to form a passage 15' between the partition and the bottom surface. In case the cover is positioned at the lower position, the grease flowing out from the roast food a is outwardly discharged from the passage and the discharge holes 23 formed at the one edge of the cover.

Further, the partition 14 blocks the roast food a, which is interposed between the body 10 and the cover 20, from being pushed toward the discharge holes 13 and 23 to prevent the discharge holes from being blocked. Therefore, the grease may smoothly flow outwardly.

Four sides 31 and 31' of the inner plates 30 and 30' protrude from the surface of the inner plate in a direction opposite to four sides 11 and 21 of the body 10 and the cover 20, respectively, and have the height h lower than that of four sides of the body and cover. Therefore, when the inner plates are accommodated in the body and the cover, the inner plates are spaced apart from the bottom surfaces of the body and the cover in proportion to the height h of four sides 31 and 31', so that cavities f and f of a desired interval are formed therebetween.

When the inner plates 30 and 30' are interposed between the body 10 and the cover 20, respectively, the inner plates 30 and 30' may be fixed. In order to easily clean the inner plates after using, it is preferable that the inner plates are detachably engaged to the body and the cover. The through-holes 32 and the 32' are respectively formed at the staggered position so that they do not coincide with the through-holes 12 and 22 of the body 10 and the cover 20. Also, bosses 32a and 32b protrude upwardly from the through-holes 32 and 32'.

Thus, when the roast is engaged to the hanger 2 over the oven 3 of a roast machine 1 in the state in which the roast food a is interposed between the inner plates 30 and 30' so as to roast the roast food, any one of the body 10 and the cover 20 confronts the flames of the burning charcoal. Although the flames enter into the through-holes 12 and 22, since the through-holes 32 and 32' of the inner plates are staggered, the entered flames do not directly contact the roast food, thereby preventing burning of the roast food.

Further, the grease generated from the roast food flows from the valley b' between the bosses 32a and 32b protruding from the inner plates 30 and 30' to the valley b of the body 10 or the cover 20, and thus is outwardly discharged through the discharge holes 13 or the discharge holes 23.

Although a part of the grease is streamed down through the through-holes 32 and 32', the grease is dropped onto the valley between the through-holes 12 and 22, so that it is not dropped onto the flames to prevent smoke or soot in the roasting course.

The heat of the burning charcoals supplied inwardly through through-holes 12 or the through-holes 22 is dispensed the cavities f and f between the bottom surfaces of the inner plate 30 and the body 10 or the inner plate 30' and the cover 20. Hence, since the heat is applied to the inner plates and then is applied to the roast food a through the through-holes 32 or the through-holes 32', the hot heat is not directly applied to the roast food. Also, the inner plates are evenly heated by the dispersed heat, so that the roast food is not overdone in the roasting process and the entire is quickly and evenly roasted.

With the above construction, the roasting time is shortened. Further, since the roast food a is roasted, with it being accommodated in the grill, the phenomenon that the moisture or grease is excessively discharged from the roast food is prevented, so that the roast food is roasted under the optimum conditions, without hardening the meat or deteriorating its taste.

Although four sides 31 and 31' of the inner plates 30 and 30' protrude in the direction opposite to the protruding direction of four sides 11 and 21 of the body 10 and cover 20, the present invention is not limited thereto. A pair of opposite sides may protrude, and other opposite sides may not protrude.

The grill according to the embodiment of the present invention is positioned over the oven 3, with it being mounted to the hanger 2 of the roast machine 1 for automatically roasting the roast food, as shown in FIG. 1, or is rotatably positioned over the oven of a common roast machine (not shown). In this case, if the body 10 and the cover 20 are alternatively turned over by rotating the grill at 180. degree. during a predetermined time, both sides of roast food a are evenly roasted.

In case of the roast machine 1 automatically roasting the roast food, a frequency and time of rotating the roast frame and a roast time may be predetermined depending upon a kind of the roast food a. In case of manually roasting the roast food, the conditions are determined by a cooker.

When it starts to roast the roast food, the locking member 40 is outwardly rotated to release the lock state, and the cover 20 is opened. Then, after the roast food a is uniformly spread on the upper surface of the inner plate 30 mounted to the body 10, the cover is closed and the locking member is locked to prevent the cover from being opened when the food is roasted. The grill is mounted to the hanger 2 of the roast machine 1.

In this case, the grill is mounted in the state shown in FIG. 4. The roast food a interposed between the inner plates 30 and 30' is pressed by bosses 32a and 32b protruding from the through-holes 32 and 32' formed in the inner plates. When the roast frame is rotated to change the position of the body 10 and cover 20, the roast food does not lean to one side, but is always maintained in the spread state, which permits the roast food to be evenly roasted.

The grease flowing out from the roast food is outwardly discharged through the discharge holes 13 when the body 10 is disposed at the lower position or through the discharge holes 23 when the body 20 is disposed at the lower position. In case the discharge holes are formed only at the corresponding sides of the body or the cover, the hanger is manufactured in such a way that when the grill is engaged to the hanger 2, the side in which the discharge holes are formed is disposed at a position lower than other side so that the grease is smoothly discharged.

When the grill is engaged to the hanger 2, the discharge holes 13 and 23 are disposed not in the inside of the oven 3 but at the outside of the oven. Hence, the grease is not dropped into the oven, but is dropped onto the outside of the oven. Since the grease is collected by separate means at the outside of the oven, the phenomenon that the grease is dropped onto the flames is prevented, thereby solving the drawback of smoke and soot.

Further, in case the position of the body 10 and the cover 20 is changed by rotating the grill, as shown in FIG. 4, the front and rear sides of the body and cover face downwards. In this case, the grease flows and collects on the bottom surface of the body, or if the grease is streamed down when the grill is rotated, the grease collects on the side. Since the grease is contained in the storage portion c formed by the shield pieces 11a and 21a, as shown in FIG. 5, the grease is not discharged through the front and rear sides during the rotation. After the grill is rotated by 180 degrees, the positions of the body and cover are changed, and the grease contained in the body is streamed down towards the cover.

If the roast has been completed, the locking member 40 is unlocked, and the cover 20 is opened. The roasted food a may be replaced by a new roast food, or after the grill is washed, the roast may be implemented.

Figure 7:
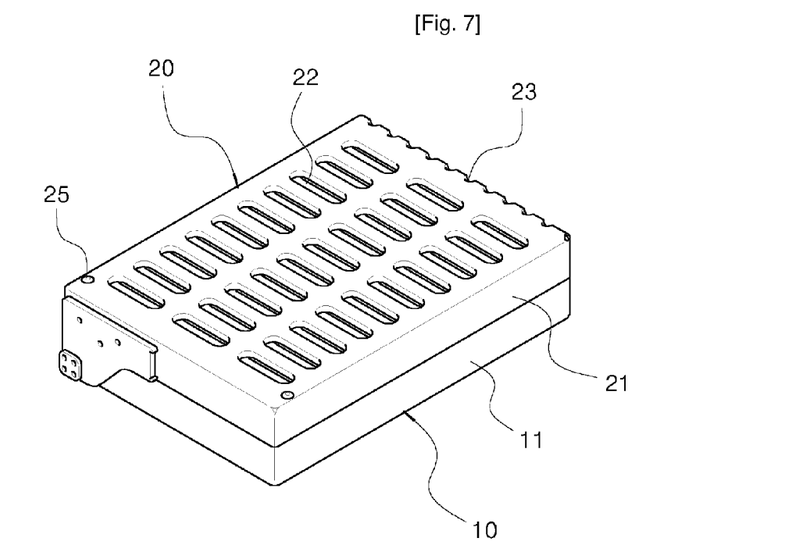
FIG. 7 is a perspective view illustrating a grill according to the second embodiment of the present invention.
Figure 8:
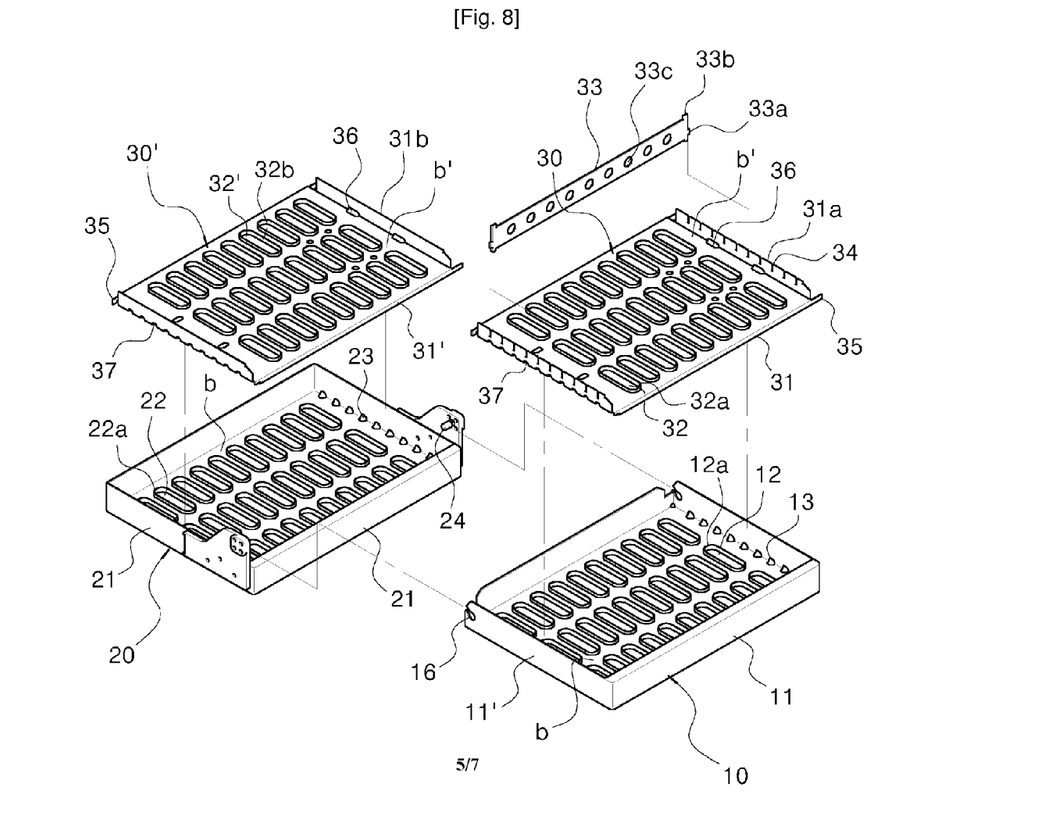
FIG. 8 is an exploded perspective view illustrating the grill according to the second embodiment of the present invention.
Figure 9:
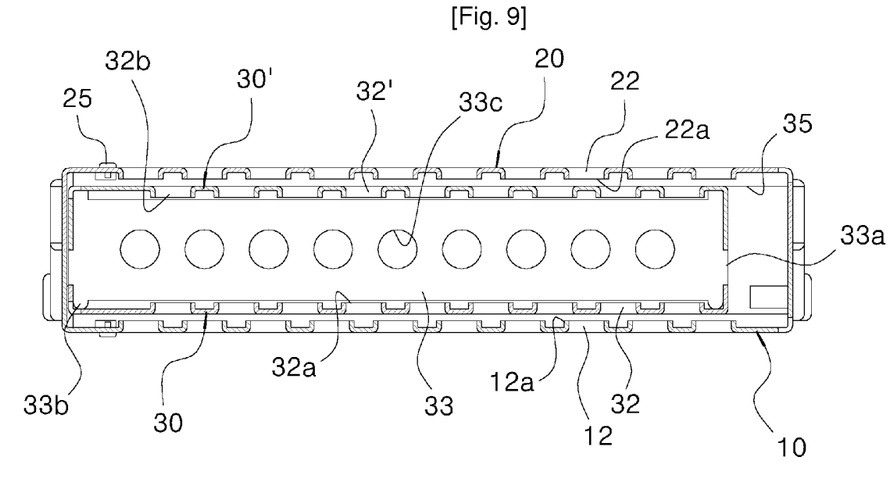
FIG. 9 is an enlarged longitudinal cross-sectional view illustrating a grill according to the second embodiment of the present invention.
Figure 10:
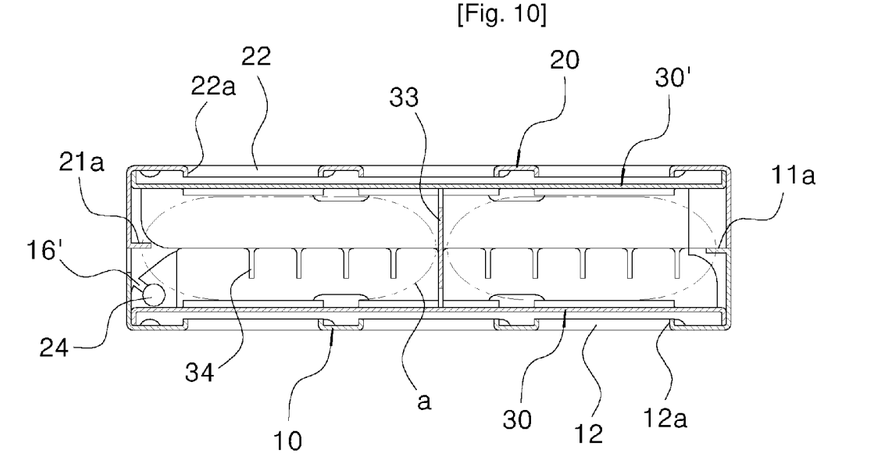
FIG. 10 is an enlarged transverse cross-sectional view illustrating a grill according to the second embodiment of the present invention.
Figure 11:
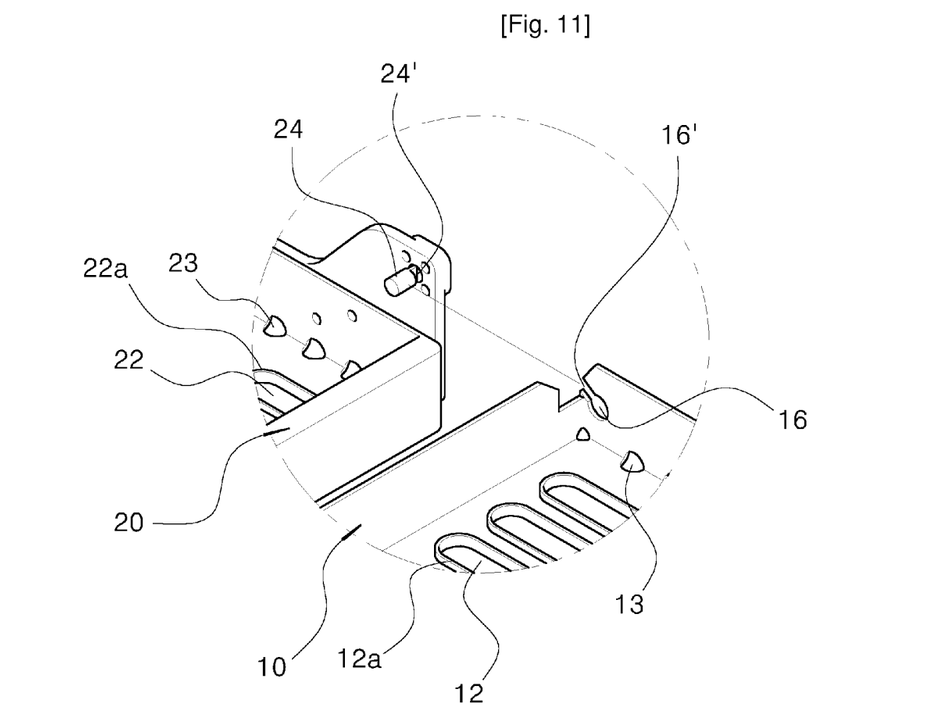
FIG. 11 is an enlarged perspective view illustrating a portion of a grill according to the second embodiment of the present invention.
Figure 12:
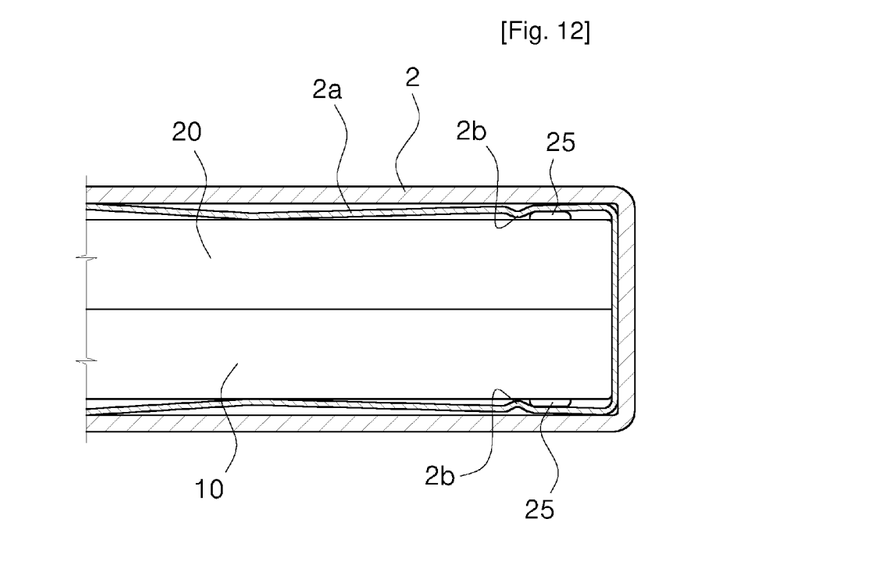
FIG. 12 is an enlarged cross-sectional view illustrating a portion of a grill according to the second embodiment of the present invention mounted to a hanger.

FIG. 7 is a perspective view illustrating a grill according to the second embodiment of the present invention. FIG. 8 is an exploded perspective view illustrating the grill according to the second embodiment of the present invention. FIG. 9 is an enlarged longitudinal cross-sectional view illustrating the grill according to the second embodiment of the present invention. FIG. 10 is an enlarged transverse cross-sectional view illustrating the grill according to the second embodiment of the present invention. FIG. 11 is an enlarged perspective view illustrating a portion of the grill according to the second embodiment of the present invention. FIG. 12 is an enlarged cross-sectional view illustrating a portion of the grill according to the second embodiment of the present invention mounted to a hanger.

With the grill according the second embodiment of the present invention, since the body 10 is easily engaged to or detached from the cover 20, the body and cover may be easily washed after using. The heat generated by the burning charcoal smoothly enters into the body by modifying the shapes of the through-holes 12 and 22 of the body and cover and the shapes of the through-holes 32 and 32' of the inner plates 30 and 30', thereby accelerating the roast and easily shaping the body, the cover, and the inner plates. When the grill is rotated, with the roast food a having a width smaller than a width of the grill being accommodated in the grill, a partition 33 is interposed between the corresponding surfaces of the inner plates to divide the space between the corresponding spaces, so as to prevent the roast from leaning to one side.

To this end, the through-holes 12 and 22; 32 and 32' are formed in a rectangular shape, contrary to the circular holes of the first embodiment, and thus the number of the through-holes is significantly reduced and the size thereof is increased.

With the construction, an inflow amount of the heat is remarkably increased, and a thermal efficiency is also significantly increased, thereby quickly roasting the roast food. Also, the reduced number of the through-holes and the increased size thereof cause the grill to be easily manufactured.

The through-holes 32 and the 32' are respectively formed at the staggered position so that they do not coincide with the through-holes 12 and 22 like the first embodiment, and the bosses 32a and 32b protrude upwardly from the through-holes 32 and 32'. Thus, when the roast is engaged to the hanger 2 over the oven 3 of the roast machine 1 in the state in which the roast food a is interposed between the inner plates 30 and 30' so as to roast the roast food, any one of the body 10 and the cover 20 confronts the flames of the burning charcoal. Although the flames enter into the through-holes 12 and 22, since the through-holes 32 and 32' of the inner plates are staggered, the entered flames do not directly contact the roast food, thereby preventing burning of the roast food.

Further, the grease generated from the roast food flows from the valley b' between the bosses 32a and 32b protruding from the inner plates 30 and 30' to the valley b of the body 10 or the cover 20, and thus is outwardly discharged through the discharge holes 13 or the discharge holes 23. Although a part of the grease is streamed down through the through-holes 32 and 32', the grease is dropped onto the valley between the through-holes 12 and 22, so that it is not dropped onto the flames.

In order to interpose the partition 33 between the inner plates 30 and 30', both sides 31a and 31b among four sides 31 and 31' of the inner plates are bent in the direction facing each other and in the direction opposite to the front and rear sides. Latching grooves 34 are formed on one side 31a of the both side at regular intervals.

The partition 33 is provided at both ends thereof with latching pieces 33a for engaging with the latching grooves 34. When the partition 33 is interposed between the corresponding surfaces of the inner plates 30 and 30', spacing pieces 33b are vertically extended from the partition for spacing the partition from the corresponding surfaces at a predetermined interval.

When the partition 33 is interposed between the inner plates 30 and 30' by engaging the latching piece 33a with the intermediate latching groove among the latching grooves, the space between the inner plates is divided into two front and rear sections, as shown in FIG. 10, so that the roast food a having the size corresponding to the space may be accommodated in the front or rear section.

When the partition 33 is interposed, the latching pieces 33a may be selectively engaged to the latching grooves 34 in view of the size of the roast food a. With the arrangement, when the grill is rotated, the accommodated roast food is supported by the partition 33, so that it does not lean to one side. The partition may be interposed in plural in view of the sizes of the grill and roast food.

The partition 33 has flow holes 33c formed therein at regular intervals, so that the heat entered into the space separated from the corresponding surface of the inner plates 30 and 30' by the spacing pieces 33b smoothly flows and the grease discharged from the roast food a flows towards the lower portion when the grill is rotated.

A spacing piece 35 is horizontally extended from the respective front and rear sides among four sides 31 of the inner plates 30 and 30'. When the inner plates are mounted to the body 10 and the cover 20, the both sides of the inner plates are spaced apart from the sides of the body and cover by the spacing pieces. Hence, the grease flowing from the roast food a to one side of the inner plates is smoothly discharged outwardly through the discharge holes 36 and the discharge holes 13 and 23 of the body and cover. Further, the inner plates have a plurality of inlet holes 37 formed therein opposite to the discharge holes, and the heat entering into the through-holes 12 and 22 is supplied to the roast food through the inlet holes 37.

In order to engage the body 10 with the cover 20 and detach the body 10 from the cover, the respective rear ends of both sides of the body has a hinge hole 16 having a receiving opening 16' with a rear portion opened. Further, the respective front ends of both sides 21' of the cover is provided with a hinge pin 24 having an inserting portion 24', and the inserting portion 24' has a thickness so that it can be inserted into the receiving opening 16'.

If the hinge pin 24 is engaged to the hinge hole 16 by inserting the inserting portion 24' into the receiving opening 16', the cover 20 is hingedly engaged to the body 10. In contrast, the body is detached from the cover by releasing the hinge pin from the hinge hole, so that the grill can be easily washed.

The body 10 and the cover 20 are provided with locking pins 25 at desired positions on the bottom surfaces of the body and cover 20 opposite to the bottom surface having the discharge holes 13 and 23 formed therein. If the grill is mounted to the hanger 2, the locking pins 25 are locked on locking bosses 2b formed on a leaf spring 2a, installed in the inner surface of both sides of the hanger, for holding the grill. The grill is mounted to the hanger in such a way that the side of the body and cover having the discharge holes is downward.

When the roast food is roasted by using the grill according to the second embodiment of the present invention, the cover 20 is opened, and the roast food a is uniformly spread on the upper surface of the inner plate 30 mounted to the body 10. Then, the grill 1 is mounted to the hanger 2 of the roast machine 1, with the cover being closed. The process of roasting the roast food is substantially identical to that of the first embodiment, and so the description thereof will be omitted herein.

When the grill is mounted to the hanger 2, the sides having the discharge holes 13 and 23 is positioned at the position lower than the opposite sides so that the grease flowing out from the roast food is smoothly discharged outwardly. In this case, the opposite sides of the body and cover are provided with the locking pins 25. The locking pins 25 are locked on the locking bosses 2b formed on the leaf spring 2a, installed in the inner surface of both sides of the hanger, for holding the grill, thereby firmly mounting the grill and thus preventing the detachment thereof.

In this case, the locking bosses lock the locking pins to prevent the grill from being released from the hanger. Therefore, the locking bosses protrude from the leaf spring so that the locking pins can easily pass through the locking bosses, without applying strong power to the grill when the grill is mounted to the hanger 2 or is detached from the hanger.

INDUSTRIAL APPLICABILITY

As described above, the grill according to the present invention can solve the problems in that the roast food is partially scorched or overdone by flames before the whole roast food is evenly well cooked, and thus the quality or taste of the food is deteriorated.

Further, the grill of the present invention does not give off smoke or soot by preventing grease from being dropped in an oven when the roast food is roasted, so that it can be usefully utilized in food services, such as a barbecue store, where provide the roasted food. Also, since the grill includes detachable body and cover, it is convenient to its maintenance.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:
1. A grill cage comprising:
a body having four sides, a bottom, and a first shield piece, wherein the bottom of the body has a plurality of first through-holes having inner ends protruded toward an interior of the body and a plurality of first discharge holes formed in one side end towards transverse direction, and wherein the first shield piece having a desired length is horizontally extended inwardly from an edge of a left or a right side among four sides;

a cover hingedly engaged to the body, the cover having four sides corresponding to the four sides of the body, a bottom, and a second shield piece, wherein the bottom of the cover has a plurality of second through-holes having inner ends protruded toward an interior of the cover and a plurality of second discharge holes formed in one side end towards transverse direction, and wherein the second shield piece having a desired length is horizontally extended inwardly from an edge of a left or a right side among four sides;

a first inner plate mounted on the body, wherein a front side and a rear side of the first inner plate are extended toward an exterior of the first inner plate, and wherein a plurality of third through-holes having inner ends protruded toward an exterior of the first inner plate are formed on a bottom surface of the first inner plate in a staggered position of the first through-holes of the body;

a second inner plate mounted on the cover, wherein a front side and a rear side of the second inner plate are extended toward an exterior of the second inner plate, and wherein a plurality of fourth through-holes having inner ends protruded toward an exterior of the second inner plate are formed on a bottom surface of the second inner plate in a staggered position of the second through-holes of the cover; and a partition for blocking the roast food, which is interposed between the first inner plate and the second inner plate and is formed in parallel with one side periphery of the body at a desired interval in an inner side of one side periphery of the body, wherein a bottom of the partition is spaced apart from the bottom surface of the first inner plate to form a passage between the partition and the bottom surface of the first inner plate, such that moisture and grease flowing out from a roast food flows towards the first discharge holes of the body, a top of the partition is spaced apart from the bottom surface of the second inner plate to form a passage between the partition and the bottom surface of the second inner plate, such that moisture and grease flowing out from a roast food flows towards the second discharge holes of the cover.

2. The grill cage as claimed in claim 1, wherein the front side and the rear side of the first inner plate are formed with latching grooves at regular intervals and provided with the partition extending substantially entirely therebetween plates; and wherein the partition has latching pieces selectively engaged to the latching grooves, such that a space between the first inner plate and the second inner plate is divided into a first section and a second section by the partition.

3. The grill cage claimed in claim 2, wherein the partition has flow holes formed therein at regular intervals and spacing pieces vertically extended from upper and lower ends of the partition for spacing the upper and lower ends of the partition from the bottom surfaces of the first inner plate and the second inner plate.

4. The grill cage claimed in claim 1, further comprising a hinge engaged to the cover and the body, wherein the hinge has hinge holes formed in the rear side and the front side of the body and hinge pins in the rear side and the front side of the cover corresponding to the hinge holes.

* * * * *